United States Patent [19]

Coeffic

[11] Patent Number: 4,483,247
[45] Date of Patent: Nov. 20, 1984

[54] CYLINDRICAL BALER WITH BALE DISCHARGE EJECTOR

[75] Inventor: Jean-Pierre Coeffic, Ottumwa, Iowa

[73] Assignee: Deere & Company, Moline, Ill.

[21] Appl. No.: 423,757

[22] Filed: Sep. 27, 1982

[51] Int. Cl.³ .............................................. B30B 5/06
[52] U.S. Cl. ...................................... 100/88; 56/341
[58] Field of Search ..................... 100/88, 89; 56/341, 56/344

[56] References Cited

U.S. PATENT DOCUMENTS

| | | | |
|---|---|---|---|
| 3,968,632 | 7/1976 | Gaeddert et al. | 56/341 |
| 3,974,632 | 8/1976 | Van der Lely | 100/88 X |
| 4,072,096 | 2/1978 | Phillips | 56/341 X |
| 4,135,352 | 1/1979 | Swenson et al. | 56/341 |
| 4,206,587 | 6/1980 | Freimuth et al. | 56/341 |
| 4,208,862 | 6/1980 | Waldrop et al. | 56/341 |
| 4,218,866 | 8/1980 | Parrish | 56/341 |
| 4,238,919 | 12/1980 | Parrish | 56/341 |
| 4,242,857 | 1/1981 | Parrish | 56/341 |
| 4,375,187 | 3/1983 | Kluver et al. | 100/88 |
| 4,393,764 | 7/1983 | Viaud | 100/88 |

OTHER PUBLICATIONS

U.S. Patent Application, Serial 294,651, filed Aug. 20, 1981, Jean Viaud.

Primary Examiner—Philip R. Coe
Assistant Examiner—Frankie L. Stinson

[57] ABSTRACT

A cylindrical baler has a bale discharge ejector movable between a retracted position and an extended position. In the retracted position, the ejector is engageable with a bale discharged on the ground underneath a bale discharge gate of the baler and is operable to move the bale rearwardly of the gate as the ejector is moved to its extended position. The ejector is retained in the extended position while the gate is closed to insure that the bale remains clear of the gate during closing. With such an ejector, the method of bale discharge is simplified. The method includes the steps of opening the gate to discharge the bale on the ground underneath the gate; moving the ejector from a retracted position to an extended position to move the bale from underneath the gate; closing the gate; and retracting the ejector.

17 Claims, 4 Drawing Figures

CYLINDRICAL BALER WITH BALE DISCHARGE EJECTOR

BACKGROUND OF THE INVENTION

This invention relates to balers for forming cylindrical bales (commonly referred to as "round" bales) and more particularly relates to a cylindrical baler with an ejector for moving a bale during discharge sufficiently rearwardly of the baler so that the discharge gate of the baler may be closed without hitting the discharged bale. Also, the invention relates to a method for discharging a bale with such an ejector.

Prior art cylindrical balers generally include a rear bale discharge gate pivotably mounted to a front portion of the baler frame. A bale is discharged from such a machine by pivoting the discharge gate rearwardly and upwardly permitting the bale to drop directly onto the ground or by first pivoting the discharge gate upwardly and rearwardly and then activating a lower conveyor on which the bale rests during formation in the bale forming chamber of the baler. The lower conveyor urges the bale rearwardly out of the machine and onto the ground. With both designs, the bale generally comes to rest underneath the discharge gate. According to one commonly used method for operating such cylindrical balers after the bale has been discharged, the operator pulls forward a short distance so that the discharge gate may be closed without hitting the discharged bale. In order to be able to pull forward without disturbing the windrow in front of the baler and possibly over feeding the baler when the baling operation is resumed, the operator must backup a few meters before discharging a bale. This is a tedious and time consuming procedure. If it is not executed properly, there is a possibility that the gate, when closed, may rest on top of the bale. This may damage the baler or even cause it to turn over.

Other equally disadvantageous prior art methods for discharging a bale are described in the Background of the Invention of U.S. Pat. No. 4,206,587.

Certain solutions have been proposed to simplify the procedure for discharge of cylindrical bales. In U.S. Pat. No. 4,206,587, a cylindrical baler with a resiliently mounted transverse bar for rearwardly propelling a bale as it is discharged from the chamber of the baler is disclosed. With the action of the resiliently mounted bar, the bale is propelled with sufficient force to roll the bale rearwardly of the baler a sufficient distance so that the discharge gate of the baler may be closed without moving the baler forwardly. Also, in U.S. Pat. Nos. 4,208,862 and 4,218,866 a cylindrical baler with a bale forming chamber defined by plurality of reversably driven chains is disclosed. The chains are driven in a first direction during the bale forming operation and then are automatically reversably driven during the bale discharge operation to impart a rearwardly directed top spin to the bale as it is discharged from the bale forming chamber. The top spin carries the bale away from the baler a sufficient distance so that the baler does not have to be driven forwardly to permit the closing of the discharge gate. Both of these approaches present certain inherent disadvantages. Both approaches provide a rearwardly directed top spin to the bale as it is discharged from the bale forming chamber. The rearward motion of the bale is uncontrolled. If the baling operation is taking place in a hilly area, the bale may roll down a hill and could position the bale in a location where it would be difficult to retrieve. Furthermore, because, with varying crop conditions, the weight of the bale may vary from one bale to the next during the baling operation, the amount of energy imparted to the bale may need to be varied from one bale to the next. With the foregoing designs, such variation is not possible.

In accordance with U.S. patent application, Ser. No. 294,651 entitled ROUND BALER WITH DISCHARGE GATE FOR REARWARDLY MOVING A BALE, filed on Aug. 20, 1981 in the name of Viaud and assigned to the assignee of the invention herein, a cylindrical baler with an improved mechanism for moving a bale rearwardly of the discharge gate following discharge of the bale from the bale forming chamber is disclosed. The discharge gate includes at least a portion of the belts or chains which define the bale forming chamber and a pump for driving the belts or chains in a direction opposite to that used for bale formation. The gate is further operable to bring a portion of the belts or chains into contact with a discharged bale and to displace the bale rearwardly from the baler along the ground by imparting a controlled rearward rolling action to the bale. Such a baler provides a solution to many of the problems associated with the prior art balers discussed above. However, such a baler still suffers from certain limitations. For example, the belts defining the bale forming chamber must be tensioned in order to apply rolling action to the bale following discharge. Second, mechanism for driving the belts in reverse must be provided. Third, the height of the gate must be properly adjusted so that the belts contact the bale. All of these requirements add complexity to the baler. In addition, if the baler is ejecting a bale on a hill with the baler headed downhill, the bale may not be moved entirely free of the gate due to the tendency of the bale to roll toward the baler.

SUMMARY OF THE INVENTION

Accordingly, it is an object of the invention to provide a cylindrical baler with a simple ejector mechanism which will move a discharged bale, in a controlled manner, sufficiently rearwardly behind the gate of the baler so that the gate may be closed without having to move the baler forwardly after ejecting the bale to close the gate.

Another object of the invention is to provide such an ejector mechanism which insures that the discharged bale will remain in a rearward location while the gate is being closed.

Still another object of the invention is to provide a cylindrical baler with an ejector mechanism which permits the baler to remain stationary during the bale discharge operation, which reduces operator fatigue normally associated with the discharge operation, which reduces the level of operator skill required, which eliminates the hazard of possibly damaging the machine during discharge of the bale and which discharges the bale simply and quickly.

These and other objects of the invention are accomplished by a cylindrical baler having a bale discharge gate pivotally mounted to a front frame section of the baler and an ejector for moving a discharged bale from a location beneath the discharge gate to a location rearward of the gate. In accordance with the improvement of this invention, the ejector mechanism is moveable between a retracted position for engagement with the bale discharged from the bale forming chamber onto the ground to a rearwardly extended position for moving the discharged bale to a location rearward of the gate.

In accordance with another feature of the invention, the ejector is moveable between the retracted position to the extended position only when the gate is in an open position. This feature insures that the bale is fully discharged on the ground and that the gate is in a position which does not interfere with the actuation of the ejector mechanism and with the movement of the bale to a location rearward of the baler.

In accordance with still another feature of the invention, the ejector is moveable from the extended position to the retracted position only after the gate is restored to a closed position. In this manner, the ejector insures that the bale is retained in a location to the rear of the baler while the gate is being moved from an open to a closed position.

In accordance with still other features of this invention, the ejector and the gate are both moveable by hydraulic cylinders. The cylinders are connected in a circuit such that the ejector cylinders are extendable or retractable responsive to a level of pressurization of the oil flow path between the gate cylinder and a hydraulic pump reached following extension or retraction respectively of the gate cylinder.

In accordance with another aspect of the invention, a method is provided for discharging a cylindrical bale from a baler including the steps of opening a bale discharge gate and discharging a bale from the baler onto the ground beneath the gate, moving the bale from a location beneath the gate to a position rearward of the gate and closing the gate. Specifically, the bale is moved from a location beneath the discharge gate to a location rearward of the gate by moving an ejector from a retracted position to an extended position. Following closure of the gate, the ejector is moved from an extended to a retracted position. In this way, it is insured that the discharged bale cannot roll toward the baler prior to closure of the gate which might happen, for example, if the bale were discharged on a hill.

DESCRIPTION OF THE PREFERRED EMBODIMENT

Figure 1:
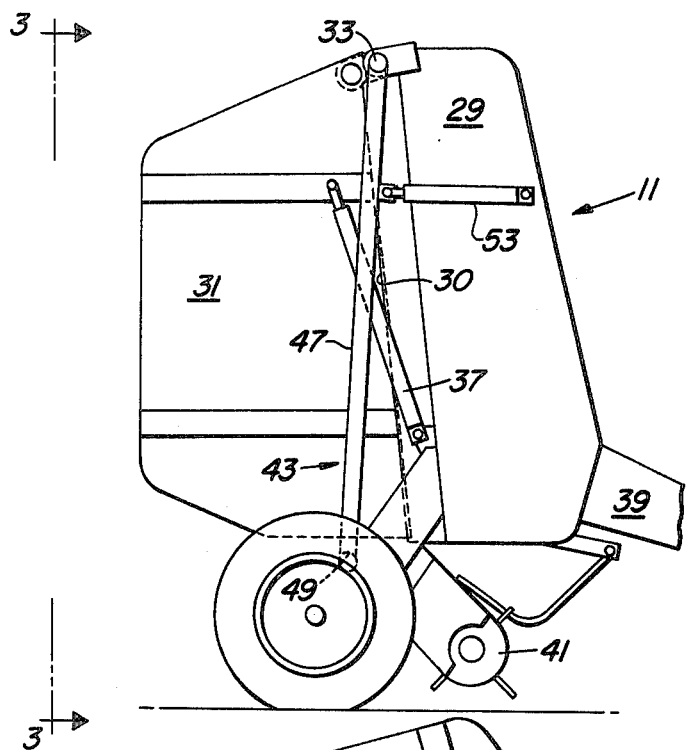
FIG. 1 is a side elevational view of a baler incorporating an ejector in accordance with the preferred embodiment of the invention.
Figure 2:
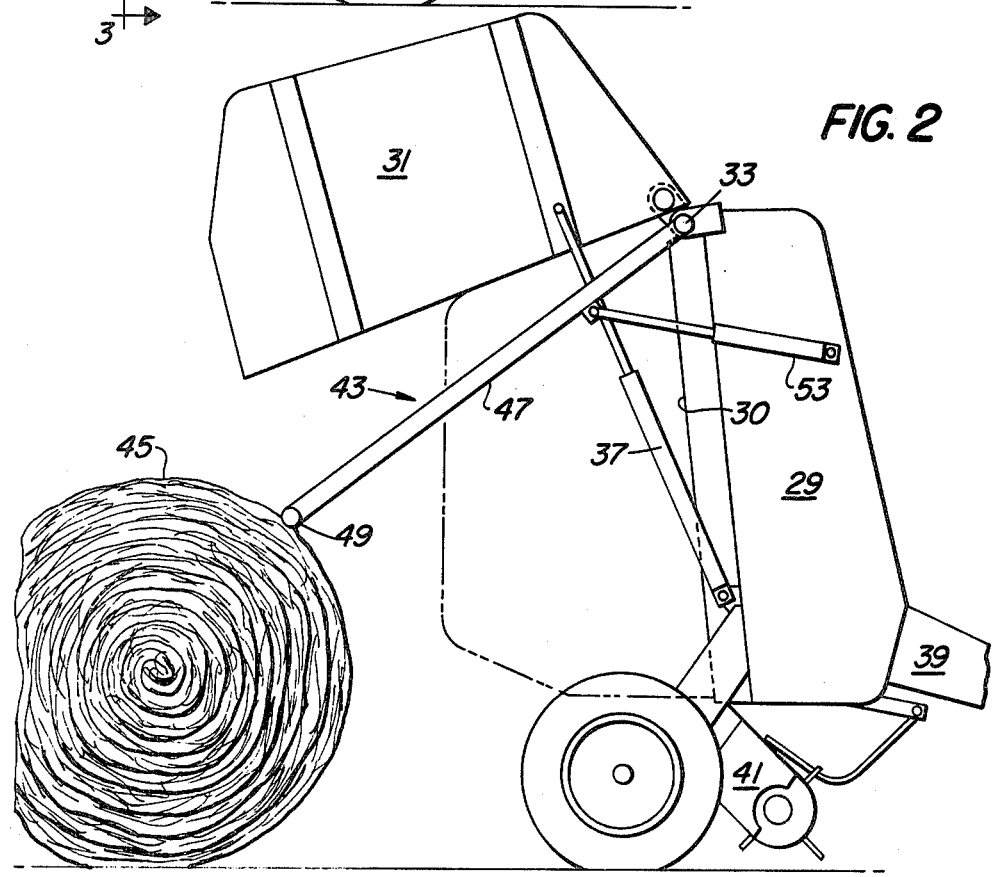
FIG. 2 is a side elevational view of the baler of FIG. 1 illustrating the discharge of a bale from the baler and the operation of the ejector to move the discharged bale from the location beneath the gate to a location rearward of the gate. The dotted line position of the gate illustrates the step of closing the gate prior to retraction of the ejector.
Figure 3:
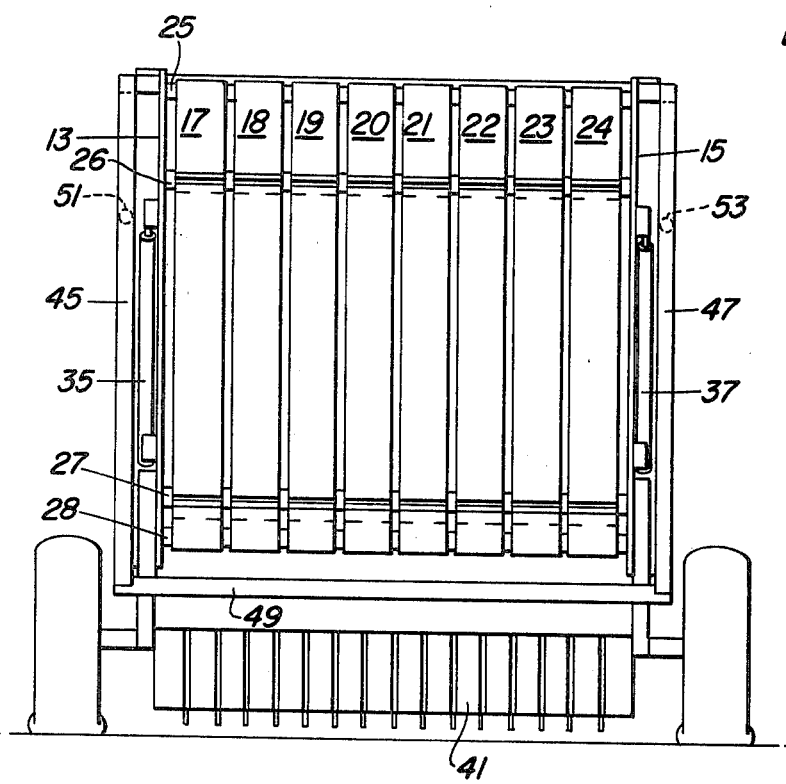
FIG. 3 is a rear elevational view of the baler of FIG. 1 taken along lines 3—3.

Reference is now made to FIGS. 1-3 illustrating a preferred embodiment of a baler 11 for forming cylindrical bales in accordance with the features of this invention. The invention herein resides in an improved mechanism for discharge and ejection of cylindrical bales formed by the baler. Baler 11 is generally comprised of a pair of opposed sidewalls 13, 15; a plurality of longitudinally extending side-by-side belts 17-24 supported on a plurality of rollers (only a few of which are shown) 25-28. A bale forming chamber is defined by the sidewalls 13, 15, the rollers 25-28 and belts 17-24. The arrangement of the belts 17-24 and the rollers 25-28 to form the bale forming chamber may be identical to that described in detail in U.S. patent application Ser. No. 308,223 filed 5 October 1981 in the name of Koning et al and entitled BELT TENSIONING SYSTEM FOR ROUND BALERS, now U.S. Pat. No. 4,391,187 issued July 5, 1983. The disclosure of this application is hereby incorporated by reference herein. However, such arrangement forms no part of the invention herein and for convenience will only be briefly described. The sidewalls 13 (and the components contained therebetween) are partitioned along parting line 30 into a front frame section 29 and a bale discharge gate 31 pivotally mounted to front section 29 on a pivot 33. The bale discharge gate 31 is moveable back and forth between a closed position for bale formation and an open position for bale discharge by means of hydraulic cylinders 35, 37.

In the general operation of the baler, the baler is drawn through a field by a tractor (not shown) attached to a tongue 39. Hay is fed into the bale forming chamber from a windrow on the ground by a pickup 41. In the baler, the hay is rolled in spiral fashion into a cylindrical bale. Upon completion, the bale is wrapped with twine and is discharged by actuation of gate cylinders 35, 37 to open gate 31 permitting the completed bale to fall onto the ground underneath gate 31.

In accordance with the features of this invention, baler 11 further includes an ejector 43 which is moveable between a retracted position (FIG. 1.) for engagement with a bale 45 discharged from the bale forming chamber of the baler onto the ground and a rearwardly extending position (FIG. 2) for moving the bale 45 from beneath gate 41 to a location rearward of gate 31. Ejector 43 includes a pair of arms 45, 47 pivotably mounted at one end on the respective ends of pivot 33 and a pusher bar 49 connected between the other ends of arms 45, 47. Movement of ejector 43 back and forth between the retracted position (FIG. 1) and the extended position (FIG. 2) is controlled by hydraulic cylinders 51, 53.

Figure 4:
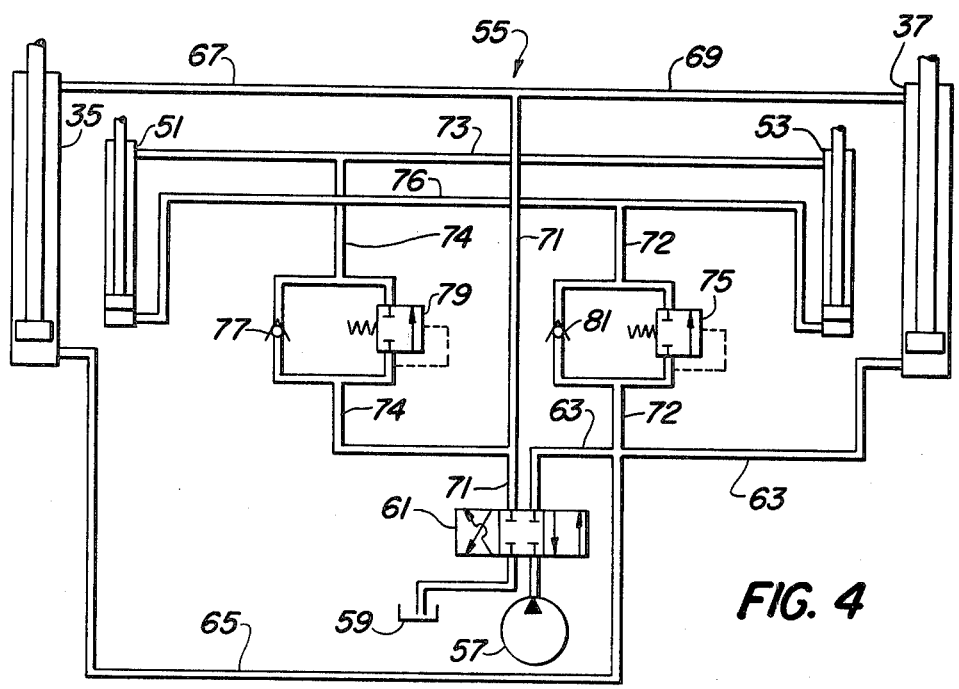
FIG. 4 is a diagram of a hydraulic circuit of the baler of FIG. 1 for operation of the discharge gate and ejector.

Reference is now made to FIG. 4 which is a diagram of the hydraulic circuit 55 for controlling the operation of gate cylinders 35, 37 and ejector cylinders 51, 53. The hydraulic control circuit 55 includes the illustration of a typical hydraulic system such as conventionally associated with an agricultural tractor such as would be used for towing the baler. The tractor system includes a pump 57, a reservoir 59 and a main control valve 61. Gate cylinders 35, 37 are connected in parallel and are extendable to open gate 31 when control valve 61 is shifted to the left in FIG. 4 connecting pump 57 to the lower ends of hydraulic cylinders 35, 37 via lines 63, 65. During extention of cylinders 35, 37 oil is returned to reservoir 59 from the upper end of cylinders 35, 37 via lines 67, 69 and common line 71.

Ejector cylinders 51, 53 are connected in parallel and are connected to the main control valves 61 and pump 57 via a pressure controlled sequence valve 75 and lines 72, 76. Sequence valve 75 permits fluid pressure to flow to and extend ejector cylinders 51, 53 only after gate cylinders 35, 37 are fully extended. By sequencing the operation of gate cylinders 35, 37 and ejector cylinders 51, 53, it is insured that prior to the operation of the ejector cylinders 51, 53 to extend ejector 43 that gate 31 is in an open position and bale 45 is discharged onto the ground. Return oil flow from the upper end of cylinders 51, 53 is transmitted to reservoir 59 via a check valve 77 and lines 73, 74, 71. The upper end of ejector cylinders 51, 53 is connected to main control valve 61 and pump 57 via a pressure controlled sequence valve 79 and lines 71, 74, 73. Sequence valve 79 permits oil flow to retract cylinders 51, 53 to move ejector 43 from its extended to its retracted position only after gate cylinders 35, 37 are fully retracted closing gate 31. By sequencing the retraction of gate cylinders 35, 37 to occur prior to the retraction of ejector cylinders 51, 53, it is insured that ejector 43 holds bale 45 in a position rearward of gate 31. Thus, gate 31 may be closed without danger of hitting bale 45 as gate 31 is swung from an open to a closed position. Return oil flow during retraction of ejector cylinders 51, 53 is transmitted to reservoir 59 via a check valve 81 connected between the lower end of cylinders 51, 53 and control valve 61 via lines 76, 72, 63.

OPERATION

In the method for discharging the cylindrical bale 45 from baler 11 in accordance with the features of this invention, gate 31 is opened and bale 45 drops out onto the ground beneath gate 31. Bale 45 is then moved from the location beneath gate 31 to a position rearward of gate 31 by moving ejector 43 from a retracted position (FIG. 1) to an extended position (FIG. 2). Gate 31 is then closed while ejector 43 remains in an extended position to insure that bale 45 does not roll back under gate 31. If gate 31 were to engage bale 45, the baler could be severely damaged. Following closure of gate 31, ejector 43 is then moved from its extended to its retracted position.

The method for discharging a bale 45 from baler 11 will now be explained in connection with the operation of hydraulic control circuit 55 shown in FIG. 4. Following the completion of and the wrapping of bale 45 with twine, gate 31 is opened by movement of control valve 61 to the left which connects pump 57 to the lower end of gate cylinders 35, 37. Gate cylinders 35, 37 are then extended to open gate 31. During extension of gate cylinders 35, 37, return oil flows to reservoirs 59 via lines 67, 69, 71. When gate cylinders 35, 37 are fully extended, sequence valve 75 receives a sufficient level of pressurization for actuation and completes the oil flow path between pump 57 and the lower end of ejector cylinders 51, 53, thereby extending cylinders 51, 53 and moving ejector 43 from its retracted to its extended position. During extension of cylinders 51, 53 return oil flow is transmitted to reservoir 59 via line 73, 74 and check valve 77. After ejector 43 is fully extended to move bale 45 from beneath gate 31, gate 31 is then closed by movement of control valve 61 to the right in FIG. 4. This connects pump 57 with the upper end of gate cylinders 35, 37 to retract cylinders 35, 37 closing gate 31. During retraction of the gate, cylinders 35, 37 return oil flow from the lower end of cylinders 35, 37 is transmitted to reservoir 59 via lines 63, 65. Following full retraction of gate cylinders 35, 37, a sufficient level of pressurization is reached to actuate sequence valve 79 and connect pump 57 with the upper end of ejector cylinders 51, 53. This retracts ejector cylinders 51, 53 to move ejector 43 from its extended to its retracted position.

It can be appreciated in accordance with practice of this invention that ejector 43 provides a controlled rolling action to move bale 45 from beneath gate 31. Thus, if it is desirable to discharge a bale on uneven terrain, it is less likely that the bale will roll uncontrolled to a remote location. In addition, by sequencing the operation of the gate 31 and the ejector 43, the discharge operation is simple and may be readily accomplished with a low level of operator skill and with a reduced potential for damage to the baler.

The invention has been explained in connection with a preferred embodiment thereof. However, it will be apparent to those skilled in the art that other modifications and embodiments of the invention are possible. Accordingly, it is intended that all such modifications and embodiments be comprehended within the scope of the appended claims.

I claim:

1. In a baler for forming cylindrical bales comprising:
a front section;
a bale discharge gate pivotably mounted to said front section;
gate moving means for moving said gate back and forth between a closed position for bale formation within a bale forming chamber formed between said gate and said front section and an open position for bale discharge;
the improvement comprising:
an ejector comprising a pair of arms, each of said arms pivoted at one end to and externally of said front section and a pusher connected between the other ends of said arms, said ejector moveable between a retracted position and a rearwardly extended position for moving a bale discharged from said chamber from a location on the ground beneath said gate to a location rearward of said gate.

2. The baler of claim 1 further comprising ejector moving means for moving said ejector back and forth between said retracted and said extended position, said ejector moving means operable to move said ejector from said retracted to said extended position only when said gate is in said open position.

3. The baler of claim 2 wherein said ejector moving means is operable to move said ejector from said extended position to said retracted position only when said gate is in said closed position.

4. The baler of claim 1 further comprising ejector moving means for moving said ejector back and forth between said retracted position and said extended position, said ejector moving means operable to move said ejector from said extended position to said retracted position only when said gate is in said closed position.

5. The baler of claim 1:
wherein said gate moving means is a hydraulic cylinder; and
further comprising (1) a hydraulic pump connected to said gate cylinder and (2) an ejector moving means comprising a hydraulic cylinder connected to said pump and a first sequence valve completing a cylinder extension path between the pump and ejector cylinder to extend said ejector cylinder responsive to the pressurization of a cylinder extension path between said gate cylinder and pump reached following extension of said gate cylinder.

6. The baler of claim 5 wherein said ejector moving means further comprising a second sequence valve for completing a cylinder retraction path between said ejector moving means and pump to retract said ejector cylinder responsive to pressurization of a cylinder retraction path between said gate cylinder and said pump reached following retraction of said gate cylinder.

7. The baler of claim 1:
wherein said gate moving means is a hydraulic cylinder; and
further comprising (1) a hydraulic pump connected to said gate cylinder and (2) an ejector moving means comprising (a) a hydraulic cylinder connected to said pump and (b) a sequence valve for completing a cylinder retraction path between said ejector moving means and said pump to retract said ejector cylinder responsive to the pressurization of a cylinder retraction path between said gate cylinder and said pump reached following retraction of said gate cylinder.

8. In a method for discharging a cylindrical bale from a baler including front section, a bale discharge gate pivoted to said front section, and an ejector for moving a bale rearwardly of said gate, said method comprising the steps of:
   (a) opening said bale discharge gate and discharging a bale from said baler onto the ground beneath said gate;
   (b) moving said bale from beneath said gate to a position rearward of said gate by moving said ejector from a retracted position to an extended position;
   (c) closing said gate;
   the improvement comprising:
   (d) moving said ejector from the extended position to the retracted position following closure of said gate.

9. The method of claim 8 wherein said baler is stationary during step (b).

10. The method of claim 8 further comprising the step of engaging and maintaining the bale in said rearward position during closure of the gate.

11. In a baler for forming cylindrical bales comprising:
   a front section;
   a bale discharge gate pivotably mounted to said front section and defining an above-ground bale forming chamber with said front section; and
   a gate moving means for moving said gate back and forth between a closed position for bale formation in said chamber and an open position for discharging a bale from said chamber to a discharge location on the ground and beneath said gate;
   the improvement comprising:
   an ejector means moveable between a retracted position and an extended position, said ejector means for engaging a bale in the discharge location, for moving the bale along the ground from the discharge location to a location rearward of the path of movement of said gate from said open to said closed position by movement of said ejector means from said retracted to said extended position and for engaging and retaining the bale in the rearward location during movement of said gate from said open to said closed position.

12. The baler of claim 11 further comprising ejector moving means for moving said ejector back and forth between said retracted and said extended position, said ejector moving means operable to move said ejector from said retracted to said extended position only when said gate is in said open position.

13. The baler of claim 12 wherein said ejector moving means is operable to move said ejector from said extended position to said retracted position only when said gate is in said closed position.

14. The baler of claim 11 further comprising ejector moving means for moving said ejector back and forth between said retracted position and said extended position, said ejector moving means operable to move said ejector from said extended position to said retracted position only when said gate is in said closed position.

15. The baler of claim 11:
wherein said gate moving means is a hydraulic cylinder; and
further comprising (1) a hydraulic pump connected to said gate cylinder and (2) an ejector moving means comprising a hydraulic cylinder connected to said pump and a first sequence valve completing a cylinder extension path between the pump and ejector cylinder to extend said ejector cylinder responsive to the pressurization of a cylinder extension path between said gate cylinder and pump reached following extension of said gate cylinder.

16. The baler of claim 15 wherein said ejector moving means further comprises a second sequence valve for completing a cylinder retraction path between said ejector moving means and pump to retract said ejector cylinder responsive to the pressurization of a cylinder retraction path between said gate cylinder and said pump reached following retraction of said gate cylinder.

17. The baler of claim 11:
wherein said gate moving means is a hydraulic cylinder; and
further comprising (1) a hydraulic pump connected to said gate cylinder and (2) an ejector moving means comprising (a) a hydraulic cylinder connected to said pump and (b) a sequence valve for completing a cylinder retraction path between said ejector moving means and said pump to retract said ejector cylinder responsive to the pressurization of a cylinder retraction path between said gate cylinder and said pump reached following retraction of said gate cylinder.

* * * * *

Disclaimer

4,483,247.—*Jean-Pierre Coeffic*, Ottumwa, Iowa. CYNDRICAL BALER WITH BALER DISCHARGE EJECTOR. Patent dated Nov. 20, 1984. Disclaimer filed June 12, 1989, by the assignee, Deere & Co.

Hereby enters this disclaimer to claim 1 of said patent.
[ *Official Gazette April 17, 1990* ]